Aug. 20, 1963

E. D. DITTO 3,101,020

CUTTING TOOL ADJUSTMENT ASSEMBLY

Filed Aug. 30, 1960

INVENTOR.
Edwin D. Ditto
BY
R. P. Barnard
ATTORNEY

Aug. 20, 1963 E. D. DITTO 3,101,020
CUTTING TOOL ADJUSTMENT ASSEMBLY
Filed Aug. 30, 1960 2 Sheets-Sheet 2

PRIOR-ART METHOD

NEW METHOD

INVENTOR.
Edwin D. Ditto
BY
C. P. Barnard
ATTORNEY

United States Patent Office 3,101,020
Patented Aug. 20, 1963

3,101,020
CUTTING TOOL ADJUSTMENT ASSEMBLY
Edwin D. Ditto, Ann Arbor, Mich., assignor to General Motors Corporation, Detroit, Mich., a corporation of Delaware
Filed Aug. 30, 1960, Ser. No. 52,817
3 Claims. (Cl. 82—36)

This invention relates generally to tool holders and more particularly to an improved cutting tool adjustment assembly.

This invention is particularly concerned with the provision of an adjustable cutting tool having no backlash and being capable of accurate micrometer adjustment. Although adjustable cutting tools are generally well known in the art, micrometer adjusting means associated therewith have previously failed to include adequate means to prevent relative movement between the cutting tool, the tool holder and the micrometer adjustment means. Consequently, the cutting tool could not be advanced or retracted an exact distance from a previous setting during a cutting operation. For instance, if a cutting tool were positioned by adjustment of a micrometer adjusting screw associated therewith and the position of the screw noted, a subsequent positioning of the cutting tool a specified distance as indicated by movement of the adjusting screw relative to the noted reference mark might or might not move the cutting tool the indicated distance from its previous position. Accuracy of adjustment has previously been dependent upon the relative movement occurring between the parts during the previous cutting operation.

Accordingly, an object of this invention is to provide means to precisely adjust a cutting tool. A further object is to provide simplified adjustment means from which backlash has been eliminated. Another object of this invention is to provide an adjustable boring tool of simple and economical construction. Other objects and advantages of the present invention will be apparent from the following detailed description and the accompanying drawings wherein.

Figure 1:
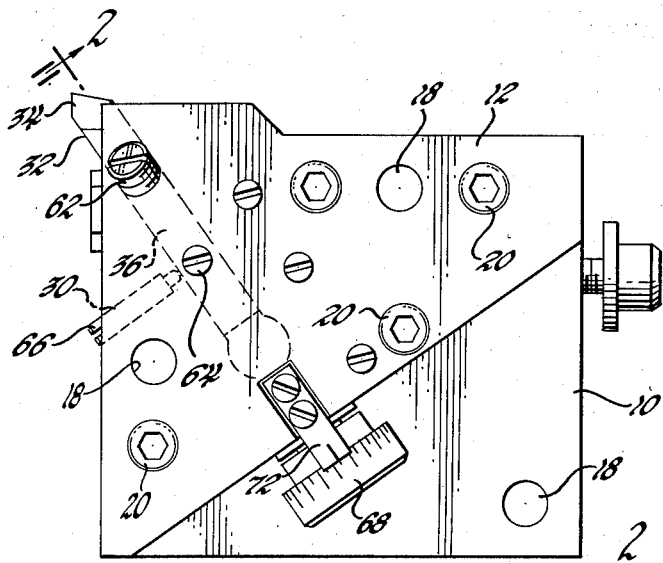
FIGURE 1 is a top elevational view of an illustrative embodiment of the present invention.
Figure 2:
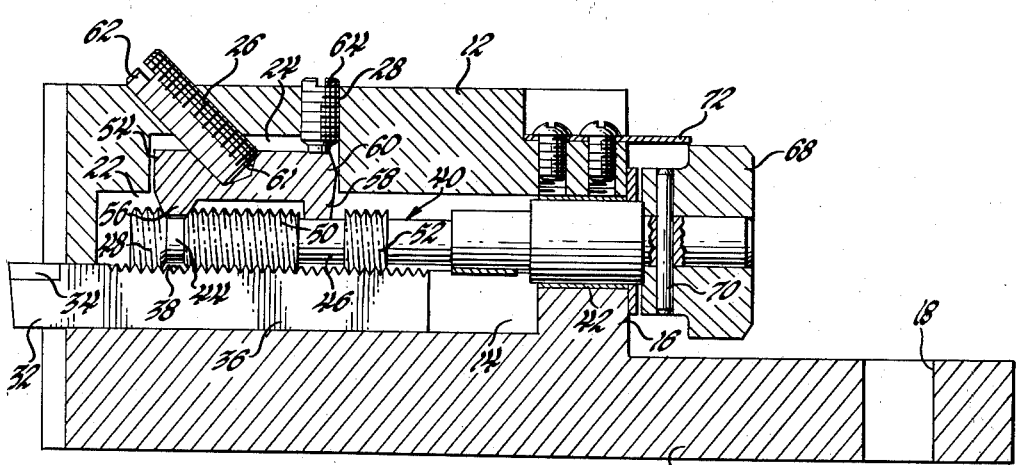
FIGURE 2 is a sectional view taken along the line 2—2 in FIGURE 1.

Referring now to FIGURES 1 and 2, the illustrative embodiment shown comprises a base plate 10 and a cover plate 12. A tool cavity 14 and a bearing post 16 are provided on the top surface of the base plate 10. Any suitable means such as a plurality of bolt holes 18 may be provided on the base plate to secure the tool block assembly adjacent a workpiece. The cover plate 12 rests on the top surface of the base plate 10 and is secured thereto by a plurality of suitable fastening means, such as the screw members 20. An adjusting screw cavity 22 and a clamping block cavity 24 are provided in the cover plate 12 and are aligned with the cutting tool cavity 14 in the assembled position. A threaded clamping screw hole 26 extends downwardly and rearwardly at an inclined angle from the top surface of the cover plate 12 into the clamping block cavity 24. A second threaded clamping screw hole 28 is provided adjacent the rear of the clamping block cavity 24. A third threaded clamping screw hole 30 is provided in the base plate 10 and extends inwardly to the cutting tool cavity 14. For purposes of this description the front of the assembly is considered to be the end from which the cutting edge of the tool or bit protrudes.

A cutting tool 32 having a cutting edge 34 and a shank portion 36 is seated in the cutting tool cavity 14. Thread means 38 are provided on the top of the shank 36 and extend substantially the entire length thereof. An adjusting screw 40 is rotatably supported in a bearing member 42 on the bearing support portion of the cover of the base plate 10 extends inwardly into the adjusting screw cavity provided by the cover plate 12. The inwardly extending end portion of the adjusting screw is provided with spaced peripheral grooves 44, 46 which separate threaded portions 48, 50, 52 which are cooperably engageable with the threaded means on the top of the cutting tool. The front groove 44 is provided with tapered side surfaces for a purpose to be hereinafter described. A clamping block 54 is slidably supported in the clamping block cavity 24 and is provided with a pair of spaced downwardly extending lug portions 56, 58. The front lug 56 is provided with tapered side surfaces which are slidably engageable with the tapered side surfaces of the front groove 44 on the adjusting screw. The rear lug 58 is adapted for engagement with the bottom of the rear groove 46 and sufficient clearance is provided between the lugs to accommodate the central threaded portion of the adjusting screw. A stop 60 is provided on the rear surface of the clamping block and is engageable with the rear surface of the clamping block cavity. An inclined screw seat 61 is provided on the upper surface of the clamping block and in alignment with the front adjusting screw hole 26 in the cover plate 12. A clamping screw 62 is threadably mounted in the inclined adjusting screw hole and the end portion thereof is adapted to be seated in the aligned inclined seat 61 on the top of the clamping block and a clamping screw 64 is threadably engaged within the threaded hole 28 and is engageable with the top surface of the clamping block 54. Another clamping screw 66 may be provided on a side surface of the assembly to engage a side surface of the shank of the cutting tool to provide lateral stability.

A micrometer adjusting knob 68 is suitably secured to the other end of the adjusting screw, such as by the pin member 70 and is aligned with an index mark provided on a rearwardly extending plate 72.

Figure 6:
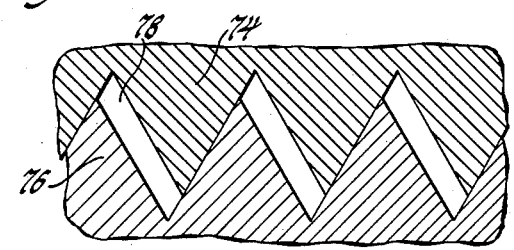
FIGURE 6 is an enlarged view of tooth engagement of previous devices illustrating the prior art.

In operation the cutting tool 32 may be slidably adjustably positioned through the driving action of the threaded portions 48, 50, 52 with the thread means 38 provided on the top of the cutting tool shank 36 by rotation of adjusting screw 40. During adjustment, the threads 74 on the adjusting screw and the threads 76 on the cutting tool shank have a driving engagement as shown in FIGURE 6. In prior apparatus, the illustrated position of the threads was not changed after adjustment and the adjusting screw and cutting tool were secured individually relative to the tool holder by conventional clamping means. Thus when the tool was clamped for a cutting operation, a gap 78 existed between the threads 74 and 76, and consequently, backlash involving movement of the threaded portions relative to one another resulted.

Figure 7:
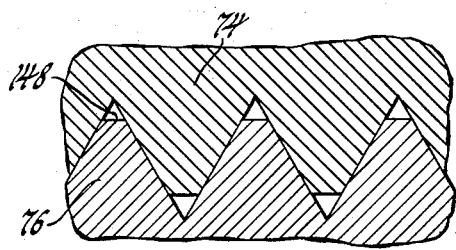
FIGURE 7 is an enlarged view of tooth engagement of the present invention.

When the tool 36 is in an adjusted position, as shown in FIGURE 2, the clamping block 54 may be forced downwardly and rearwardly by actuation of the inclined adjusting screw 62 to position the clamping block stop 60 against the side surface of the clamping block cavity 24 and to force the front lug 56 downwardly into the tapered groove 44 to secure the cutting tool and adjusting screw in place. The clamping screw 62 is positioned at an acute angle relative to the longitudinal axes of the cutting tool and adjusting screw to permit the clamping block 54 to simultaneously engage the rear surface of the clamping block cavity 24 which prevents longitudinal movement and positions the adjusting screw 40 and the tool bit downwardly against the base plate to prevent vertical play. The rear clamping screw 64 is provided to enable the application of an additional clamping force on the rear end of the clamping block, the rear portions of the adjusting screw 40 and cutting tool 32. As shown in FIGURE 7, the threads 74 are driven downward into abutting engagement with both adjacent faces of the threads 76 to eliminate the gap 78 and prevent relative movement between the cutting tool and the adjusting screw.

In this manner, the cutting tool and adjusting screw are secured in place and all backlash is eliminated so that the relative positions of the parts remain unvaried during a cutting operation and subsequent adjustment of the cutting tool by reference to the calibrated knob and the index mark will insure that the new position of the cutting tool exactly corresponds with the amount of adjustment indicated.

Figure 3:
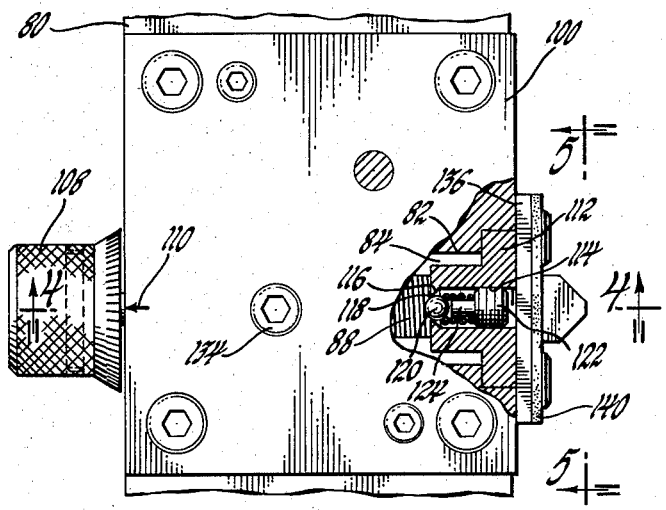
FIGURE 3 is a top elevational view of a preferred embodiment of the present invention.
Figure 4:
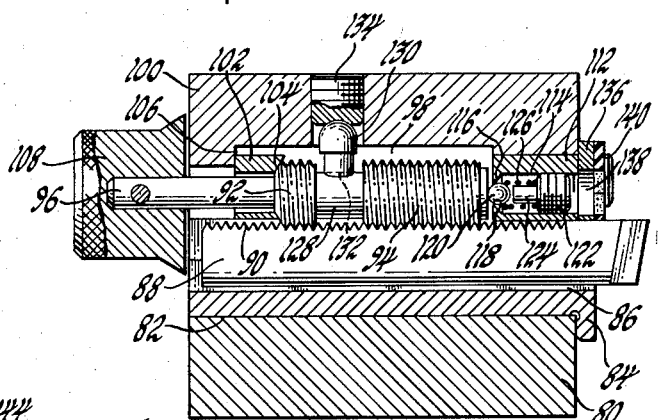
FIGURE 4 is a sectional view taken along the line 4—4 in FIGURE 3.
Figure 5:
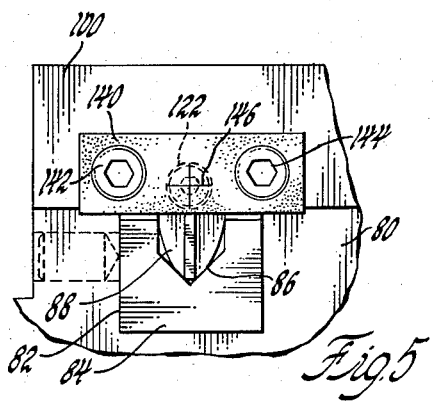
FIGURE 5 is an end view taken along the line 5—5 in FIGURE 3.

An alternative and preferred embodiment of the present invention is shown in FIGURES 3–5 and comprises a support block 80 adapted to be secured in any suitable conventional manner to a machine turret or other support surface. A transverse groove 82 is provided in the support block 80 and receives a cutting tool holding sleeve 84. A groove 86 is provided in the sleeve 84 and contoured to receive the shank of a cutting tool 88. Although the sleeve 84 provides means to accommodate different size cutting tools, the groove 86 may also be formed integrally with the support block 80. The lower side surfaces of the groove 86 are downwardly and inwardly inclined as shown in FIGURE 5 to receive corresponding inclined side surfaces of the cutting tool 88. The top surface of the cutting tool is provided with coined or rolled threads 90 which are cooperatively engaged with threaded portions 92, 94 of a threaded adjusting screw 96. The adjusting screw 96 is rotatably supported in a cavity 98 provided within a cover plate 100. A support bearing 102 is provided with a conical bearing surface 104 at one end and is adapted to receive a corresponding conical surface provided on the end of the threaded portion 92. The other end of the bearing 102 abuts a shoulder 106 provided by the cover plate 100. A calibrated micrometer adjusting knob 108 is attached to the end of the adjusting screw 96 and is cooperable with suitable indicia 110 for accurate adjustment of the cutting tool 88. A T-shaped plate 112 is supported between the cover plate 100 and the support block 80 and spans the groove 82. The plate 112 is provided with a bore 114 that terminates in a conical tapered seat 116 having an inwardly opening port 118. A ball member 120 is adapted to be seated within the port 118 in abutting engagement with the end of the adjusting screw 96 by means of a threaded clamping screw 122 having an inwardly extending drive shaft 124. A compression spring 126 is positioned around the shaft 124 in abutting engagement between the adjusting screw 122 and the ball member 120. In this manner the ball member 120 is continually biased against the adjusting screw 96 and maintains the conical end portion of the threaded portion 92 in continuous abutting engagement with the conical bearing sleeve 104. A reduced portion 128 of the threaded adjusting screw 96 separates the threaded portions 92, 94 and is adapted to receive a clamping pin 130 having a semi-cylindrical lower surface 132 correspondingly dimensioned to the cylindrical portion 128 for abutting engagement therewith. An adjusting screw 134 is threadably positioned in a threaded adjusting hole provided within the cover plate 100 to variably position the pin 130.

A cover plate 136 secures the T-shaped plate 112 in position and is provided with an adjusting port 138 for receiving a suitable tool to adjust the threaded screw 122. A resilient protective plate 140 is sandwiched between the cover plate 136 and the attaching screws 142, 144 to protect the cover plate from chips during the cutting operation. The protective covering 140 may be made from neoprene or other suitable material and is provided with a slit 146 adjacent the port 138 to permit entry of an adjusting tool.

In adjusting operation of the preferred embodiment shown in FIGURES 3–5, the clamping screws 122 and 134 are loosened to permit rotation of the adjusting screw 96. Rotation of the adjusting screw 96 drives the cutting tool 88 forwardly or rearwardly within the cutting tool slot 86 provided in the support sleeve 84. When the cutting tool 88 is in the desired position, the clamping screws 134 and 122 are adjusted to secure the cutting tool in place. Rotation of the clamping screw 134 downwardly drives the clamping pin 130 into peripheral engagement with the cylindrical portion 128 of the adjusting screw 96 and forces the threads on the threaded portions 92, 94, into complete surface engagement with the threads provided on the top of the adjusting screw 88 as shown in FIGURE 7. The tips of the threads 74, 76 may be squared as at 148 to permit complete engagement between the adjacent faces of the teeth. The clamping screw 122 is rotated inwardly to position the shaft 124 in abutting engagement with the ball member 120 and to fixedly position the conical end portion of the adjusting screw 96 in abutting engagement with the conical portion 104 of the bearing sleeve 102. In this manner the adjusting screw 96 is completely secured against longitudinal movement and the inclined lower surface 88 is forced downwardly into frictional engagement with the tapered side surfaces of the support groove 86 and clamped thereto by the downward force exerted through the clamping pin 130. The cutting tool is therefore completely restrained from any movement in either a vertical or horizontal plane, and consequently, backlash is entirely eliminated so that subsequent adjustment of the cutting tool will be referenced from the exact previous position.

While the invention is susceptible of variations in the details of construction and the arrangement of the parts, a preferred embodiment has been illustrated in the drawings and described in detail. It should be understood, however, that there is no intention to unnecessarily limit the invention to the specific details disclosed, that on the contrary, the intention is to cover all obvious modifications and alternative constructions which are within the spirit and scope of the invention as expressed in the appended claims; except as limited by the prior art.

The invention claimed is:

1. A tool block and assembly comprising a base plate, a cutting tool cavity provided in said base plate, a cover plate, an adjusting screw cavity provided in said cover plate, a clamping block cavity provided in said cover plate and aligned with said cutting tool cavity and said adjusting screw cavity, a cutting tool slidably supported in said cutting tool cavity, thread means provided on said cutting tool, an adjusting screw rotatably supported adjacent said cutting tool and extending into said adjusting screw cavity, thread means provided on said adjusting screw and being cooperably engaged with said thread means on said cutting tool, a plurality of circumferential grooves provided on said adjusting screw, a clamping block slidably supported in said clamping block cavity, lug means provided on said clamping block and engageable with said grooves, first clamping means to force said clamping block downwardly into locking engagement with said adjusting screw and said cutting tool, and a second clamping means forcing said clamping block in engagement with one wall of said clamping block cavity.

2. In a tool assembly, a housing, a guideway in said housing, a cutting tool slidably accommodated in said guideway, a threaded adjusting screw rotatably engageable with said cutting tool, drive means provided on said cutting tool and being cooperable with said adjusting screw to variably position said cutting tool in said guideway, a portion of said adjusting screw being of reduced diameter and interrupting the threads thereon, a recess provided in said housing and located adjacent said adjusting screw, a clamping member retained in said recess and being axially restrained therein, a portion of said clamping member being engageable with said portion of said adjusting screw to prevent movement thereof, and locking mean associated with said clamping member for causing said clamping member to lock said adjusting screw and said cutting tool in place, and for releasing said clamping member for permitting movement of said cutting tool relative to said adjusting screw and said housing.

3. In a tool assembly, a housing, a guideway in said housing, a cutting tool slidably accommodated in said guideway, thread means provided on said cutting tool, a threaded adjusting screw rotatably supported in threaded engagement with said cutting tool, control means for rotating said threaded adjusting screw to move said cutting tool relative to said support member, clamping means movable at right angles to the axis of rotation of said adjusting screw and into engagement therewith, the threads of said adjusting screw and said cutting tool being cooperably contoured to permit the side faces of each tooth of said adjusting screw thread means to be driven into abutting engagement with both adjacent side surfaces of the thread means provided on said cutting tool to prevent longitudinal movement therebetween, axial clamping means comprising a bearing member rotatably supporting said threaded adjusting screw, a conical abutment surface provided on said bearing member, a conical abutment surface provided on said threaded adjusting screw and adapted to be received within said conical abutment surface of said bearing member, and releasable means to secure said threaded adjusting screw within said conical abutment surface and prevent axial movement thereof.

References Cited in the file of this patent
UNITED STATES PATENTS

| | | |
|---|---|---|
| 81,664 | Millard | Sept. 1, 1868 |
| 406,582 | Harrigan | July 9, 1889 |
| 1,251,140 | Van Der Vorn | Dec. 25, 1917 |
| 2,043,689 | Zempel | June 9, 1936 |
| 2,274,244 | Miller | Feb. 24, 1942 |